United States Patent [19]

Salo et al.

[11] Patent Number: 5,023,985
[45] Date of Patent: Jun. 18, 1991

[54] COATED ROLL FOR A PAPER MAKING MACHINE

[75] Inventors: Jukka Salo; Pentti Lehtonen, both of Jyväskylä, Finland

[73] Assignee: Valmet Paper Machinery Inc., Finland

[21] Appl. No.: 481,881

[22] Filed: Feb. 20, 1990

[30] Foreign Application Priority Data

Feb. 28, 1989 [FI] Finland ............................. 890953

[51] Int. Cl.$^5$ ............................................. B21B 31/08
[52] U.S. Cl. ......................................... 29/132; 29/130
[58] Field of Search ................... 29/132, 130; 101/375, 101/348; 355/282, 285, 290, 295; 100/155 R, 173; 162/357

[56] References Cited

U.S. PATENT DOCUMENTS

| | | | |
|---|---|---|---|
| 2,374,194 | 4/1945 | Grupe | 29/132 |
| 3,955,342 | 5/1976 | Johnson et al. | 29/132 |
| 4,149,797 | 4/1979 | Imperial | 29/132 |
| 4,503,769 | 3/1985 | Andersen | 29/117 |
| 4,518,244 | 5/1985 | Kageyama et al. | 29/132 |
| 4,522,866 | 6/1985 | Nishikawa et al. | 29/132 |
| 4,704,776 | 11/1987 | Watanabe et al. | 29/132 |
| 4,860,652 | 8/1989 | Kawata | 29/132 |
| 4,883,715 | 11/1989 | Kuge et al. | 29/132 |
| 4,949,130 | 8/1990 | Torino | 355/282 |

FOREIGN PATENT DOCUMENTS

| | | | |
|---|---|---|---|
| 2620381 | 11/1977 | Fed. Rep. of Germany | 29/132 |
| 53249 | 3/1988 | Japan | 29/132 |

*Primary Examiner*—P. W. Echols
*Assistant Examiner*—David P. Bryant
*Attorney, Agent, or Firm*—Steinberg & Raskin

[57] ABSTRACT

A roll for a pulp machine, paper machine, or paper finishing machine with a cylinder mantle of cast iron or steel, or any other equivalent metal, which bears the mechanical loads. On the roll mantle, fixed to the outer face of the mantle, there is a resilient polymer coating, and onto the polymer coating a coating is fixed which is by several orders thinner than the radial thickness of the polymer coating. This coating fixed onto the outer face of the polymer coating is a metal, ceramic, cermet or plastic coating.

14 Claims, 4 Drawing Sheets

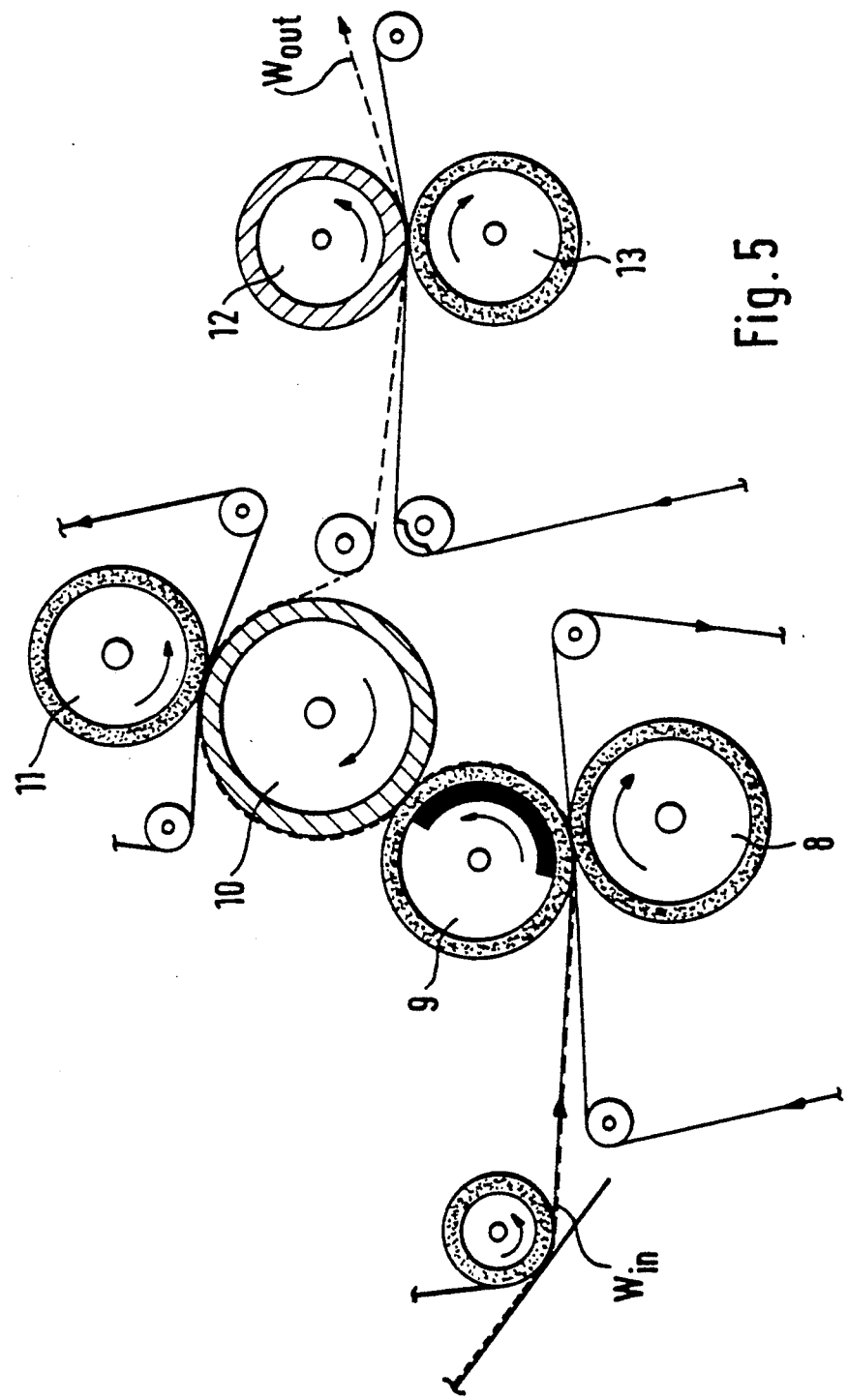

COATED ROLL FOR A PAPER MAKING MACHINE

BACKGROUND OF THE INVENTION

The invention concerns a roll for a pulp machine, paper machine, or paper finishing machine, said roll comprising a roll mantle of cast iron or steel or any other, equivalent metal, which bears the mechanical loads, as well as a method for the manufacture of the roll and the use of such a roll.

Coated rolls are used in paper machines and paper finishing machines in highly varying applications. As examples of such applications should be mentioned press rolls, suction rolls, soft rolls of calenders and supercalenders, and the equivalent. In different applications and in different processes, different quality requirements are imposed on the roll coating. Usual quality factors of a coating are, among other things, hardness at a certain temperature, resistance to temperature, resistance to compression, chemical strength, smoothness of its face, resistance to mechanical damage, elasticity, surface energy, electrical conductivity, and resistance to ageing.

Thus, more specifically, what is required from paper machine rolls and mainly from roll coatings are surface properties such as hardness/ wear resistance, e.g., in the case of G-rolls and calender rolls, resilient surface, nip and oscillation properties, e.g., in the case of soft-faced press rolls, friction properties, e.g., in the case of paper guide rolls and central rolls, and resistance to corrosion, e.g., in the case of all rolls in the wet end.

The soft coatings on rolls are usually made of organic polymers or mixtures of these polymers which frequently also contain inorganic elements. The soft coatings on rolls are frequently composite constructions, which comprise layers made of different materials.

A problem, e.g., in the case of supercalenders is the poor resistance to heat of coatings made of natural fibres, whereby the high surface temperature of a metal-faced roll, which is advantageous in view of the calendering result, cannot be utilized to the full extent. An increased temperature also restricts an increasing of the compression pressure in calender nips. The roll face is readily damaged in operation. On the other hand, synthetic materials are highly expensive, and limiting factors in the choice of synthetic materials include resistance to heat, hardness, elasticity, and properties of surface energy.

Traditionally attempts have been made to modify the coating properties of polymer-coated rolls by inserting into the coating mixing various additives and fillers. By means of such mixing, attempts have been mostly made to modify/improve properties of the polymer such as cost, wear resistance, resistance to corrosion, thermal conductivity, stiffness, properties of detaching, friction, properties of hysteresis, etc. As one of the problems associated with the mixing it should be mentioned that, when a polymer material is mixed to modify some property, at the same time some other property important for the operation deteriorates. For example, there is a polymer material which operates very well in view of the operation of a press roll, which means that the nip width is good, there are no problems with respect to hysteresis heat, the running quality is good, the adhesion to the metal frame is good, and, moreover, it endures surface pressures and attenuates oscillations, but a residual problem is that the wear resistance is not sufficiently good. In traditional methods, to improve the wear resistance hard, finely divided particles which increase the wear resistance are mixed into the polymer. This mixing increases the wear resistance of the coating, but at the same time it deteriorates properties vital for the press roll, and, as a result, the nip width is reduced, the ability to attenuate oscillations is lowered, the adhesion to the metal frame becomes weaker, the running quality suffers, and in some cases also the resistance to corrosion is reduced. In the worst cases, the final result may be an unusable roll.

Generally speaking, in respect of the prior art regarding the technique of mixed coatings, the Applicant's FI Patent 72,073 is mentioned, wherein a press roll is described whose surface layer is composed of a mixture of a metal powder and an inorganic material. The function of the metal is to act as a binder agent and to increase the toughness of the roll coating, and the function of the inorganic material is to provide a wear-resistant surface of suitable surface energy, because the surface energy of the roll must be within certain limits in order that the detaching of the paper web from the face of the press roll should be controlled. The Applicant's FI Pat. Appl. No. 853544 is of a type similar to that mentioned above. As prior art, reference is also made to the Applicant's FI Pat. Appl. No. 882006, wherein the coating is composed of a powder which consists of carbide-rich powder and of matrix powder.

In the prior art, various multi-layer constructions of rolls and processes for their manufacture are also known. As an example should be mentioned the FI Patent No. 66,667 (Eduard Kusters), wherein, on the roll core, there are a number of rings made of steel in the axial direction, and onto the cylinder core an inner layer and an outer layer have been fixed, which are surrounded from the outside by said rings. A layer construction is also known from the FI Patent No. 55,457 (Beloit Corporation), wherein a combination roll is described, which comprises three concentric roll mantles made as separate casts, a metallurgical bond being provided between said roll mantles. Also, from the FI Pat. Appl. No. 880592 a roll is known which is provided with a multi-layer coating.

One polymer coating and a method for its manufacture are known from the FI Pat. Appl. No. 854748.

SUMMARY OF THE INVENTION

An object of the present invention is a roll which has an unusually high number of the properties mentioned above.

More specifically, an object of the present invention is a roll which has the good properties both of a polymer roll and of a wear-resistant roll.

With a view to achieving the objectives stated above, the method in accordance with the invention is characterized in that on the roll mantle, there is a combination of the following layers permanently fixed to one another in the following sequence in the radial direction starting from the inside:

1) a resilient polymer coating fixed onto the outer face of said frame mantle and 2) a coating fixed onto the outer face of said polymer coating, which is by several orders thinner than the radial thickness of the polymer coating.

Also, the method in accordance with the invention is characterized in that the method of application of the polymer coating fixed onto the outer face of the frame is mold casting, rotation casting, submerging, spraying, extrusion, centrifugal coating, lamination, electrocoating, fluidized coating, lining, or filament winding, and the method of application of the coating fixed onto the outer face of the polymer coating is thermal spraying, grain blowing, or sprinkling, intensified by heating if necessary, or a method of application of polymer coating mentioned above.

Thus, in the invention a roll of a pulp, paper finishing or paper machine which is polymer-coated is coated with a further, second coating, which is a metal, ceramic or cermet coating with a view to obtaining or improving wear resistance, or, for example, a plastic coating when it is desirable to combine properties of different polymers. In this way, the roll may be provided both with the ability to attenuate the oscillations of an organic coating and with the wear resistance of a metal/ceramic coating.

By means of a coating in accordance with the invention, for example, combinations of properties as follows are strived for. A resilient base coating that attenuates oscillations and on which there is a wear-resistant surface has adjustable friction properties and is provided with particular detaching properties.

In said example, in which a polymer material was known which operated well in view of the operation of a press roll but which had the problem of poor wear resistance, according to the invention, the coating is manufactured so that a polymer whose nip properties are known to be good is chosen as the resilient coating. Onto this polymer, a thin ceramic and hard (higher than 2000 HV) coating layer is applied to improve the wear resistance. Since the ceramic material is not mixed with the polymer, properly speaking, but forms a hard and wear-resistant layer on its surface, the properties of the polymer are not changed. The wear resistance of the surface is, however, improved in accordance with the objective. The polymer coating material is some polymer, such as thermoplastic or thermosetting plastic, rubber, thermoplastic rubber, or elastomer. The metal coating may be, e.g., stainless steel, tool steel, molybdenum nickel, cobalt, tungsten, chromium, or an alloy thereof. The ceramic coating may be an oxide, carbide, nitride, boride, titanate or silicate, or a mixture thereof. The cermet coating may be, e.g., a mixture of the ceramic materials and metals mentioned above. The second plastic coating may be a thermoplastic or theremosetting plastic, rubber, thermoplastic rubber, elastomer, or reinforced plastic.

In accordance with the various properties strived for, coatings of different thicknesses and different materials are required for a roll, so that the above list is not restrictive, but the basic starting point is, however, always a resilient base material which is manufactured by means of methods that will be described in the following and which said base material is covered by a second, hard coating.

The thickness of the polymer layer may be within a range of 2 ... 35 mm, typically about 10 mm, and the thickness of the hard coating within a range of 1 $\mu$m to 150 $\mu$m, depending on the particle size, which is within a range of 1 ... 100 $\mu$m, typically 20 $\mu$m.

Different properties are important in different applications, for example surface energy in a center roll and friction properties and smoothness in other applications, such as calender rolls or the carrier roll of a slitter.

The roughness of the face is within the range of Ra=0.1 ... 20 $\mu$m, being about 5 $\mu$m when friction and roughness are desired and 1 $\mu$m when wear resistance is desired.

One embodiment of the invention is a roll in which the outer coating is not continuous but is shaped so that it permits resilience of the underlying polymer layer. This is accomplished, e.g., by means of a so-called "scale coating", wherein, when the polymer layer yields, the non-continuous portions in the, e.g., hard outer face behave like scales and overlap each other partly, thereby permitting deformations of the polymer coating.

As materials of the roll frame it is possible to use roll frame materials known in the prior art, such as steel, cast iron, etc.

The method of application of the polymer coating may be mold casting, rotation casting, submerging, spraying, extrusion, centrifugal casting, lamination, electrocoating, fluidized coating, or lining. The method of application of the hard outer coating may be thermal spraying, grain blowing, or sprinkling, which has been intensified by heating if necessary. As the method, it is also possible to use a method of application of the polymer coating mentioned above, for example a layer of reinforced plastic applied onto the resilient elastomer coating (filament winding).

An application of the invention may be, e.g., a Symroll for a press, comprising grooved polyurethane which has been cast and coated with tungsten carbide applied as hypersonic flame spraying.

Further applications of the invention include a suction roll, whose coating may be grooved, perforated or blind-drilled, or a center roll, a breast roll, traction rolls (in which the friction properties are important), pick-up-suction rolls, return rolls, paper alignment rolls, felt and wire alignment rolls, Sym-roll, center roll, etc. Other fields of application are rolls in coating devices, spreader rolls, rolls in the drying section, calender rolls, reeler rolls, and Pope cylinder.

When a roll in accordance with the invention is being manufactured, the inner polymer coating and the outer coating are preferably made at the same time, e.g., by means of two separate nozzles, and thereby the coating is completed in one step.

As an example will be described the coating of a carrier roll for a slitter.

A property to be required from a carrier roll in a slitter is adequate friction for the paper roll. As a rule, the jumbo roll produced from a paper machine has been formed as follows: When paper is reeled onto the reeling drum, the reeling tension varies as a function of the nip pressure between the reeling cylinder and the reeling drum. When such a roll, which has been formed with different reeling tensions, enters into nip contact with another roll/ rolls by means of its own weight, the nip becomes uneven, i.e. the roll is supported only at some portions, there are different nip pressures in the axial direction, and the reeling tensions are varying. If the carrier roll has a soft face, the roll "sits" better in the nip. In the prior art this has been arranged by means of thermal spraying, applying a hard coating layer onto the face of a metal roll and by allowing said layer to remain unground so as to obtain sufficient coarseness of the face. According to the present invention, said carrier roll is coated, by means of a method which will be described in more detail below, e.g., so that polyurethane is chosen as the polymer coating material and rotation casting is chosen as the process of manufacture. SiC (silicon carbide) is chosen as the hard outer coating layer, and sprinkling through a nozzle is chosen as the process of manufacture. Both layers of the entire coating structure are completed at the same time.

In the prior-art rotation casting method the polymer casting nozzle moves in the axial direction of the roll at a certain speed while the roll revolves. The polymer-casting nozzle is followed by a second nozzle, through which the hard particles are run at a certain flow rate. By means of the flow rate it is possible to regulate the amount of hard particles in the surface, by means of the particle size the roughness of the surface, by means of specific weight the depth of penetration of the hard particles into the polyurethane. The depth of penetration can also be regulated by means of pressure of the hard particles and/or by means of their pre-heating or after-heating (e.g. induction).

By means of the technique in accordance with the invention, it is also possible to manufacture a hard-coated polymer-faced grooved roll.

BRIEF DESCRIPTION OF THE DRAWINGS

In the following, the invention will be described in more detail by means of FIGURES, which are not supposed to restrict the invention.

FIG. 5 illustrates a second application of the invention.

DESCRIPTION OF THE PREFERRED EMBODIMENTS

Figure 1:
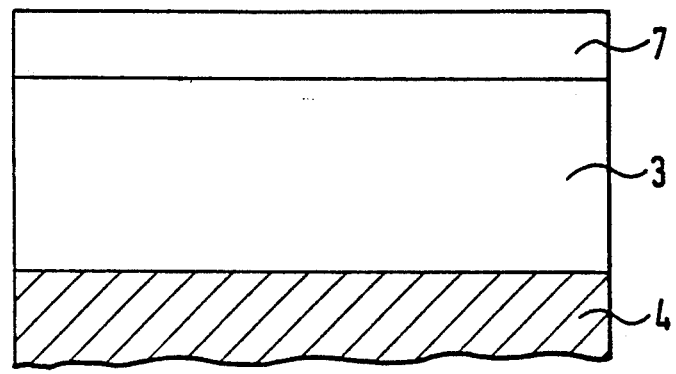
FIG. 1 is a sectional view of a first embodiment of the invention.

FIG. 1 is a sectional view of a coating of a roll in accordance with the invention. Onto a roll frame 4 made of materials known in prior art a resilient polymer base coating 3 which attenuates oscillations has been formed, said coating 3 being covered by a further, second coating 7, which is, e.g., harder and wear-resistant. The outer coating 7 has, e.g., wear-resistant properties and, moreover, its friction properties and detaching properties can be regulated to make them suitable in a way known in the prior art.

Figure 2:
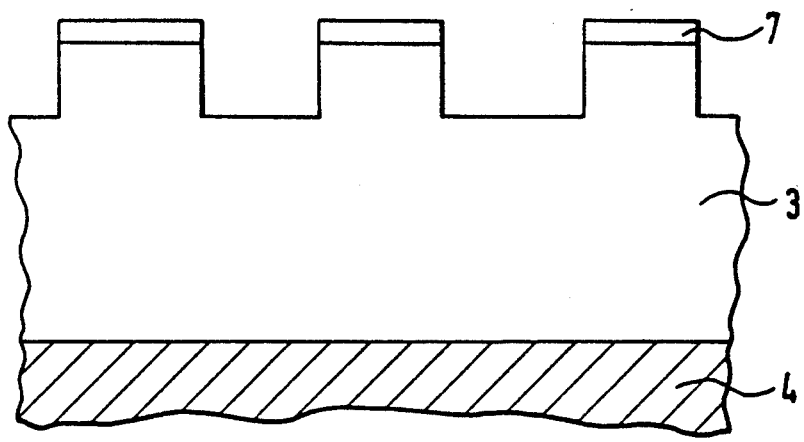
FIG. 2 is a sectional view of a second embodiment of the invention.

FIG. 2 shows a second version of a roll in accordance with the invention. This version is used as a grooved roll, and its polymer coating 3 has been grooved in accordance with FIG. 2, the projecting parts in said coating being covered with a hard coating 7.

Figure 3:
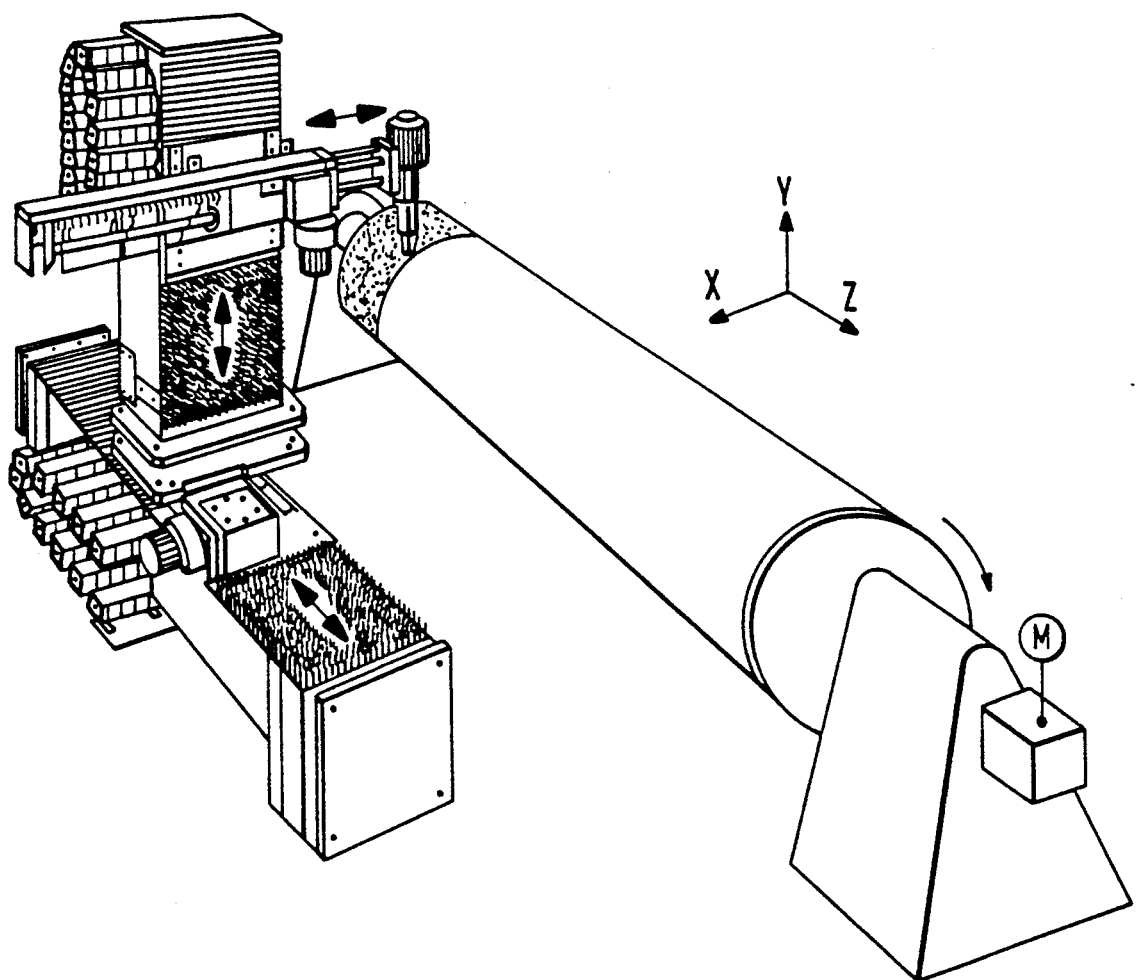
FIG. 3 illustrates a coating process.

FIG. 3 illustrates the principle of rotation casting: In rotation casting the roll to be coated is rotated at a certain speed in a horizontal position. The polymer casting head is fed in the axial direction of the roll at a certain speed. The position of the nozzle in the casting head is located precisely by means of the movements x, y and z. The liquid polymer flows through the nozzle in the casting head onto the roll face, and thereby the roll is coated.

Figure 4:
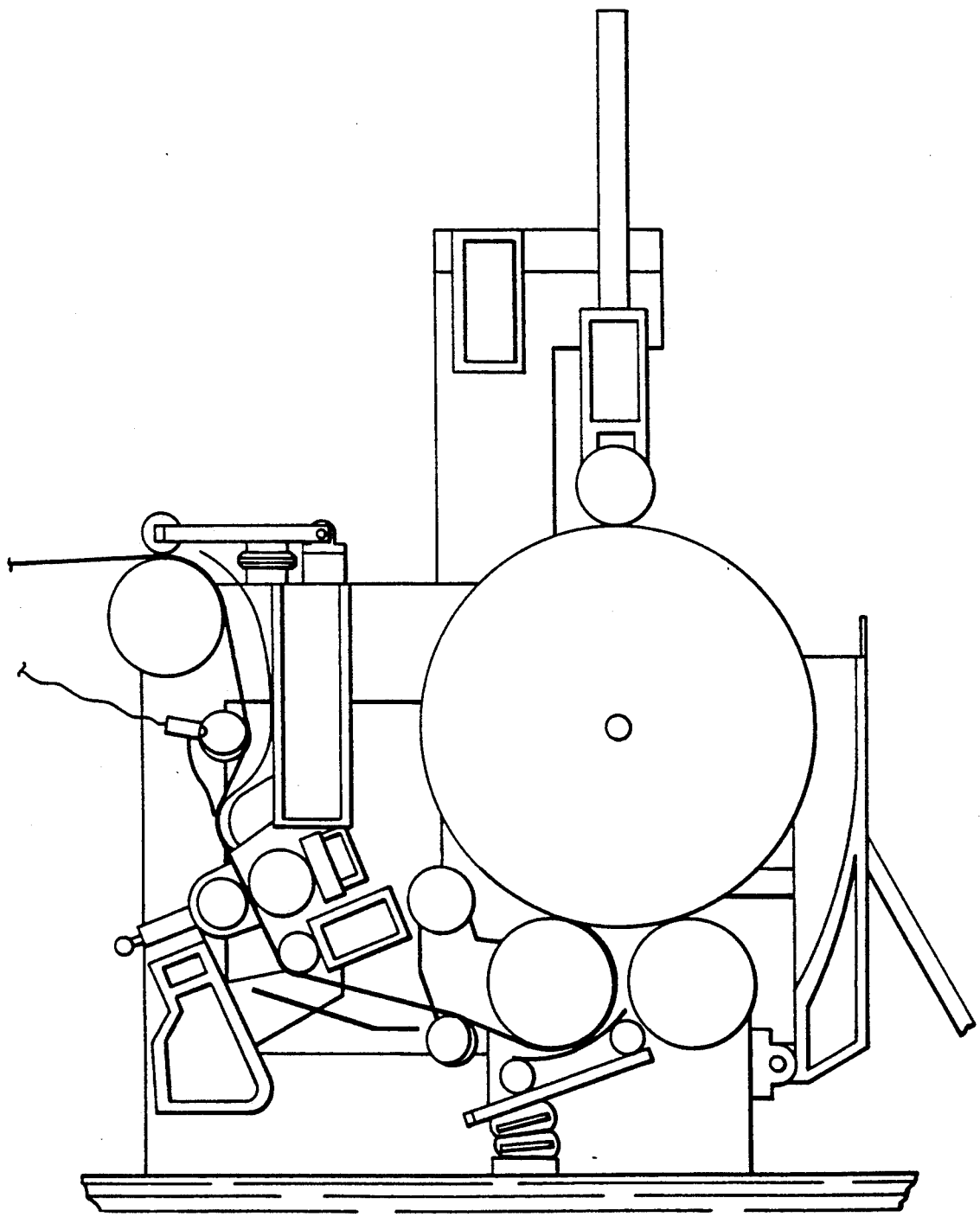
FIG. 4 illustrates an application of the invention.

FIG. 4 illustrates a carrier-roll slitter, which is one field of application of the invention.

FIG. 5 shows a press section, whose various rolls may constitute applications of the invention. In FIG. 5 the paper web entering into the press is denoted with $W_{in}$ and the web leaving the press with $W_{out}$. In the press the paper web runs through a few nips consisting of different rolls, water being removed out of the web in said nips. The reference numerals 8 and 13 denote the lower press rolls and the numerals 11 and 12 the upper press rolls. The reference numeral 10 denotes the center roll 10 in the press, and the reference numeral 9 a central suction roll, the latter rolls being important applications of the invention.

In the following the patent claims will be given, whereby the details of the invention may show variation within the scope of the inventive idea defined in said claims.

What is claimed is:

1. A roll for a pulp machine, paper machine or paper finishing machine comprising:
   a roll or cylinder mantle;
   a resilient polymer coating which is formed on an outer surface of said mantle, said resilient polymer coating having a thickness within a range of 2 to 35 millimeters; and
   another coating which is formed on an outer surface of said resilient polymer coating of a harder and more wear-resistant material than said resilient polymer coating, another coating having a thickness within a range of 1 to 150 microns.

2. The roll of claim 1, wherein said another coating is a metal.

3. The roll of claim 1, wherein said another coating is a ceramic.

4. The roll of claim 1, wherein said another coating is a cermet.

5. The roll of claim 1, wherein said another coating is a plastic.

6. The roll of claim 1, wherein said resilient polymer coating is from the group consisting of thermoplastics, rubber, thermoplastic rubber and elastomers.

7. The roll of claim 2, wherein said metal is from the group consisting of stainless steel, tool steel, molybdenum, nickel, tungsten, and chromium.

8. The roll of claim 2, wherein said metal is an alloy comprising at least two metals from the group consisting of stainless steel, tool steel, molybdenum, nickel, tungsten, and chromium.

9. The roll of claim 3, wherein said ceramic is from the group consisting of an oxide, carbide, nitride, boride, titanate, and silicate.

10. The roll of claim 3, wherein said ceramic is a mixture of at least two ceramics from the group consisting of said oxide, said carbide, said nitride, said boride, said titanate, and said silicate.

11. The roll of claim 4, wherein said cermet is a mixture of at least one ceramic from the group consisting of an oxide, carbide, nitride, boride, titanate, and silicate and at least one metal from the group consisting of stainless steel, tool steel, molybdenum, nickel and cobalt.

12. The roll of claim 5, wherein said plastic is from the group consisting of thermoplastic, thermosetting plastic, elastomer, and reinforced plastic.

13. The roll of claim 1, wherein said another coating is non-continuous such that resilient yielding of said resilient polymer coating can occur.

14. The roll of claim 6, wherein said another coating is a scale coating such that said resilient layer can be deformed.

* * * * *